United States Patent [19]

Evans et al.

[11] Patent Number: 4,760,117

[45] Date of Patent: Jul. 26, 1988

[54] METHOD FOR PREPARING COPOLYCARBONATES FROM CYCLIC POLYCARBONATE OLIGOMERS

[75] Inventors: Thomas L. Evans, Clifton Park; Tohru Takekoshi, Scotia; Patricia P. Anderson, Albany, all of N.Y.

[73] Assignee: General Electric Company, Schenectady, N.Y.

[21] Appl. No.: 907,557

[22] Filed: Sep. 15, 1986

Related U.S. Application Data

[63] Continuation-in-part of Ser. No. 899,374, Aug. 22, 1986, abandoned, and Ser. No. 894,154, Aug. 7, 1986, Pat. No. 4,699,974, and Ser. No. 877,623, Jun. 23, 1986, Pat. No. 4,695,612, and Ser. No. 875,025, Jun. 16, 1986, abandoned, and Ser. No. 810,613, Dec. 19, 1985, abandoned, and Ser. No. 743,446, Jun. 11, 1985, Pat. No. 4,657,989.

[51] Int. Cl.[4] .............................................. C08L 71/04

[52] U.S. Cl. .................................... 525/394; 525/146; 525/148; 525/413; 525/415; 525/425; 525/432; 525/433; 525/439; 525/453; 525/464; 525/467; 525/468; 525/471; 525/474; 525/535

[58] Field of Search ................ 528/196, 370; 525/464, 525/394, 905, 146, 148, 413, 415, 425, 432, 433, 439, 453, 464, 467, 471, 474, 535, 468

[56] References Cited

U.S. PATENT DOCUMENTS

| | | | |
|---|---|---|---|
| 3,189,662 | 6/1965 | Vaughn | 525/474 |
| 3,402,143 | 9/1968 | Hay | 525/397 |
| 3,419,634 | 12/1968 | Vaughn | 525/474 |
| 3,703,564 | 11/1972 | White | 525/397 |
| 3,819,744 | 6/1974 | Buchner et al. | 525/464 X |
| 4,102,940 | 7/1978 | Thom et al. | 525/464 X |
| 4,374,233 | 2/1983 | Loucks et al. | 525/394 |
| 4,431,795 | 2/1984 | Krimm et al. | 528/323 |
| 4,436,876 | 3/1984 | Loucks | 525/394 |
| 4,611,048 | 9/1986 | Peters | 528/185 |
| 4,644,053 | 2/1987 | Brunelle et al. | 528/371 |
| 4,657,989 | 4/1987 | Evans | 525/464 |

FOREIGN PATENT DOCUMENTS 0162379 11/1985 European Pat. Off. .

OTHER PUBLICATIONS

Rokicki et al., *Polymer Journal*, 17, 509–516 (1985).

*Primary Examiner*—Theodore E. Pertilla
*Attorney, Agent, or Firm*—William H. Pittman; James C. Davis, Jr.; James Magee, Jr.

[57] ABSTRACT

Copolycarbonates are prepared by ring-opening cyclic polycarbonate oligomers with various nucleophilic polymers. The latter include "living" anionic vinyl polymers; polymers such as polyphenylene ethers or hydroxyaryl-terminated polyimides which contain deprotonated hydroxy or carboxy groups; polymers containing neutral nucleophilic moieties, such as secondary amine-terminated polyimides, polyethersulfones and polyetherketones; and anionic polymers of ring-opened compounds such as cyclic polysiloxanes, lactams and lactones.

38 Claims, No Drawings

METHOD FOR PREPARING COPOLYCARBONATES FROM CYCLIC POLYCARBONATE OLIGOMERS

This application is a continuation-in-part of the following applications:

Ser. No. 743,446, filed June 11, 1985 now U.S. Pat. No. 4,657,989;

Ser. No. 810,613, filed Dec. 19, 1985, now abandoned;

Ser. No. 875,025, filed June 16, 1986, now abandoned;

Ser. No. 877,623, filed June 23, 1986, now U.S. Pat. No. 4,695,612;

Ser. No. 894,154, filed Aug. 7, 1986, now U.S. Pat. No. 4,699,974; and

Ser. No. 899,374, filed Aug. 22, 1986, now abandoned.

This invention relates to the preparation of copolycarbonates, and more particularly to a method for the preparation of a wide variety of copolycarbonates from cyclic polycarbonate oligomers.

There are numerous disclosures in the art of copolycarbonates of various types. For example, block polysiloxane-polycarbonates are described in U.S. Pat. Nos. 3,189,662, 3,419,634 and 3,994,988; block copolymers of polycarbonates and vinyl monomers in 4,101,522 and 4,202,949; polyester-polycarbonates in 3,641,200, 4,297,455 and French published application 2,235,965; block copolycarbonate-poly(methyl methacrylates) in 4,319,003; block polyphenylene ether-polycarbonates in 4,374,233, 4,436,876 and 4,463,132; co-(aliphatic polyamide)-polycarbonates in 4,431,795; and carbonate-linked polyalkylene glycols in 4,189,609. Thus, the advantageous properties of copolycarbonates of a wide variety of structures are known.

The present invention provides a method for preparing various kinds of copolycarbonates, both random and block, by a novel method of wide application. This method is simple and versatile and affords products useful in diverse industries and applications.

In its broadest sense, the present invention is a method for preparing a copolycarbonate which comprises reacting (A) at least one aromatic cyclic polycarbonate oligomer composition with (B) at least one acyclic polymer other than a polycarbonate, said polymer containing nucleophilic moieties which are effective to ring-open the cyclic molecules of reagent A.

The cyclic polycarbonate oligomer compositions useful as reagent A in the method of this invention comprise a plurality of structural units of the formula $$-O-R^1-O-\overset{O}{\overset{\|}{C}}-, \qquad (I)$$

wherein at least about 60% of the total number of $R^1$ values are divalent aromatic organic radicals, the balance thereof being aliphatic, alicyclic or aromatic organic radicals. Such compositions include dimers, trimers and tetramers of the type disclosed in the following U.S. patents: Nos.

3,155,683
3,274,214
3,386,954
3,422,119.

Also included, and generally preferred, are cyclic polycarbonate oligomer mixtures of the type disclosed in European patent application 162,379 and in copending, commonly owned applications Ser. No. 704,122, filed Mar. 20, 1985, now U.S. Pat. No. 4,644,053, and Ser. No. 871,641, filed June 6, 1986, now U.S. Pat. No. 4,727,134, the disclosures of which are incorporated by reference herein.

Preferably at least about 80% of the total number of $R_1$ values in the cyclic oligomer mixtures, and most desirably all of said $R^1$ values, are aromatic. The aromatic $R^1$ radicals preferably have the formula $$-A^1-Y^1-A^2- \qquad (II)$$

wherein each of $A^1$ and $A^2$ is a monocyclic divalent aromatic radical and $Y^1$ is a bridging radical in which one or two atoms separate $A^1$ from $A^2$. The free valence bonds in formula I are usually in the meta or para positions of $A^1$ and $A^2$ in relation to $Y^1$.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^1$, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^1$ values may be considered as being derived from dihydroxy compounds of the formula $HO-R^1-OH$, especially dihydroxyaromatic compounds and preferably bisphenols of the formula $HO-A^1-Y^1-A^2-OH$. The following dihydroxy compounds are illustrative:

Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane 1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)-propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl)ether
Bis(4-hydroxyphenyl)sulfide
Bis(4-hydroxyphenyl)sulfoxide
Bis(4-hydroxyphenyl)sulfone
Bis(3,5-dimethyl-4-hydroxyphenyl)sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 10% by weight, and most often no more than about 5%, of such linear oligomers are present. The mixtures also usually contain low percentages (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

These mixtures may be prepared by a condensation reaction involving at least one bishaloformate having the formula $$R^1(OCOX^1)_2 \qquad (III)$$

wherein $R^1$ is as defined hereinabove and $X^1$ is chlorine or bromine. The condensation reaction typically takes place interfacially when a solution of said compound in a substantially non-polar organic liquid is contacted with a tertiary amine from a specific class and an aqueous alkali metal hydroxide solution. Also present may be other compounds, including oligomers of the formula

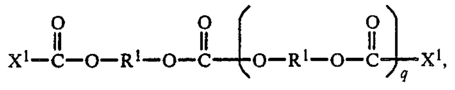

wherein $R^1$ and $X^1$ are as previously defined and q is a small number, typically about 1–4.

The tertiary amines useful for cyclic oligomer preparation ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Suitable aqueous alkali or alkaline earth metal hydroxide or carbonate solutions (hereinafter sometimes designated "metal base") include lithium, sodium, potassium or calcium hydroxide or sodium or potassium carbonate. Sodium hydroxide is preferred because of its availability and relatively low cost. The concentration of the solution is not critical and may be about 0.2–16M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer composition, the reagents and components are maintained in contact under conditions whereby the bischloroformate is present in low concentration. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate, and optionally other reagents, are added gradually to a reaction vessel containing solvent.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 1.5 mole of bischloroformate per liter of organic liquid in the reaction system, including any liquid used to dissolve bischloroformate. Preferably, about 0.003–1.0 mole of bischloroformate is used.

The molar proportions of the reagents constitute another important feature for yield and purity maximization. The preferred molar ratio of amine to bischloroformate used alone (calculated as bisphenol bischloroformate) is about 0.1–1.0:1 and most often about 0.15–0.6:1, and that of metal base to bischloroformate is about 1.5–3:1 and most often about 2–3:1.

Separation of the oligomer mixture from at least a portion of the high polymer and insoluble material present is sometimes necessary or desirable. When other reagents are added to the metal base and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions described hereinafter are employed, the product may contain 10% or even less of such material. Depending on the intended use of the cyclic oligomer mixture, the separation step may then be unnecessary.

When such removal is necessary, it may be achieved by conventional operations such as combining the crude product, as a solid or in solution, with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The cyclic bisphenol A polycarbonate oligomer mixtures have been shown to contain oligomers having degrees of polymerization from 2 to 12, including substantially all of those from 2 to 6, with about 50–70% (by weight) thereof being in the range from 2 to 5. It is generally preferred to use said mixtures as prepared, or optionally with separation of high polymer and/or insolubles.

Also useful as reagent A are the cyclic heterocarbonate oligomer compositions disclosed and claimed in copending, commonly owned application Ser. No. 890,053, filed July 28, 1986, now U.S. Pat. No. 4,696,998, the disclosure of which is also incorporated by reference herein. Said compositions comprise oligomers having the formula

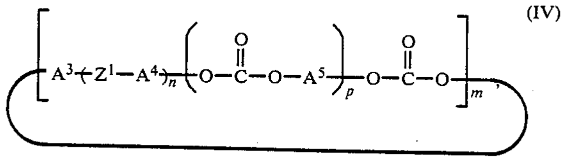

(IV)

wherein:

each of $A^3$, $A^4$ and $A^5$ is independently a divalent aromatic hydrocarbon or substituted aromatic hydrocarbon radical;

$Z^1$ is a divalent radical containing at least two non-carbon linking atoms;

m is from 1 to about 12;

n is from 1 to about 6; and p is from 0 to about 6;

the total number of carbonate moieties in each of said oligomers being up to about 12.

The $A^3$, $A^4$ and $A^5$ values in the oligomers of formula IV are divalent aromatic radicals. They include hydrocarbon radicals and substituted hydrocarbon radicals wherein the substituents may be alkyl (particularly $C_{1-4}$ alkyl), halo, nitro, cyano, alkoxy and the like. Most often, the $A^{3-5}$ radicals are all hydrocarbon radicals and $A^3$ is identical to $A^4$. The $A^{3-5}$ radicals are most often each m- or p-phenylene or have formula II, wherein each of $A^1$, $A^2$ and $Y^1$ are as previously defined.

The $Z^1$ value is a divalent radical containing at least two non-carbon linking atoms. By "non-carbon linking atom" is meant an atom other than carbon or hydrogen forming an integral link between two portions of the molecule of formula I, rather than merely forming all or part of a substituent thereon. The $Z^1$ value may also contain one or more aliphatic, alicyclic or aromatic hydrocarbon or substituted hydrocarbon moieties.

Suitable linking atoms include oxygen, sulfur, nitrogen, phosphorus and silicon. Thus, the $Z^1$ value is characterized by the presence of two or more moieties such as amide, imide, urethane, urea, sulfonamide, imidazole, oxazole, thiazole, ether, ester, sulfide, sulfoxy, sulfone, phosphate, phosphite, phosphoramidate, phosphazene, phosphonate and siloxane.

The following are illustrative $Z^1$ values. In each formula, $R^2$ and $R^3$ may each be a mono- or polyvalent aliphatic, alicyclic or aromatic radical as appropriate.

Amide: 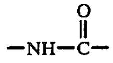 or

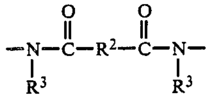

Ester:  or

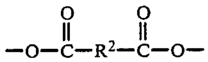

Ether: $-O-R^2-O-$

Ether imide: 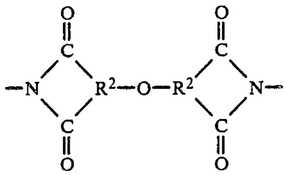

Ether ketone: 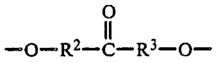

Ether ester: 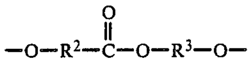

Ether sulfone: $-O-R^2-SO_2-R^3-O-$

Urethane: 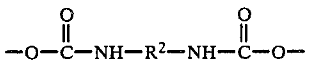

Urea: 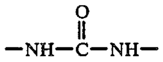

Amideimide:

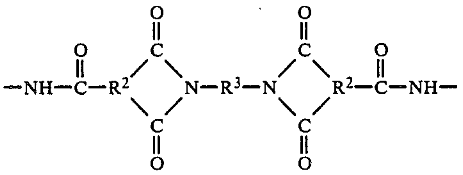

Sulfide: $-S-R^2-S-$

Sulfone: $-SO_2-R^2-SO_2-$

Orthocarbonate: 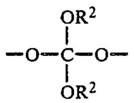

Ortho ester: 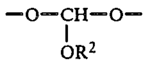

Sulfonamide: $-NH-SO_2-$ or $-NH-SO_2-R^2-SO_2-NH-$

-continued

Imidazole: 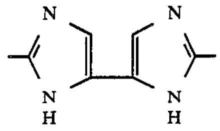

Benzoxazole: 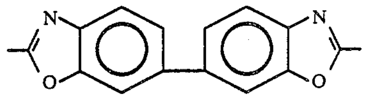

Benzothiazole: 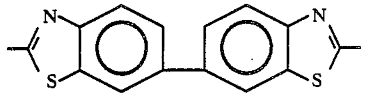

Siloxane: 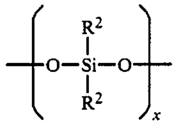 or

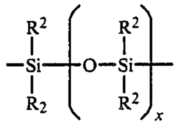

(x = 1 or more)

Phosphate: 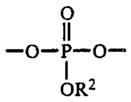

Phosphite: 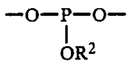

Phosphoramidate: 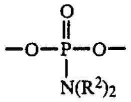

Phosphonate: 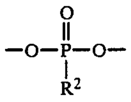

Phosphazene: 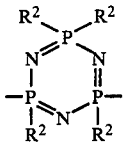

It should be understood that the foregoing molecular structures are only illustrative and that numerous other types of structures are suitable as the $Z^1$ value in the cyclic heterocarbonates.

It is generally preferred that $Z^1$ have a total formula weight of at least 50, more preferably at least 80. Still more desirably, the $$-A^3\!-\!\!(Z^1-A^4)_{n} \qquad (V)$$

moiety has a formula weight of at least about 200, and most desirably at least about 500. (However, formula weights above about 1500 are generally not preferred since molecules containing such large groups may be difficult to convert into cyclics, favoring formation of linears.) Included are oligomer mixtures in which n may have any and all values up to about 6. Most often, a major proportion of the radicals of formula V are monomer, dimer and trimer radicals (n is 1, 2 and 3 respectively).

Among the particularly preferred cyclic heterocarbonates are those in which $Z^1$ contains at least one ester, amide, urethane, ether ester, ether imide or ether sulfone moiety. The following are still more particularly preferred; in each instance, $A^3$ and $A^4$ are as previously defined.

(1) Polyester-carbonates in which $Z^1$ has the formula

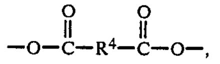

(VI)

wherein $R^4$ is a divalent $C_{2-12}$ aliphatic, alicyclic or aromatic hydrocarbon radical, and n has an average value of 1-3. Most often, $R^4$ is a monocyclic aromatic hydrocarbon radical, preferably m- or p-phenylene.

(2) Polyurethane-carbonates in which $Z^1$ has one of the formulas

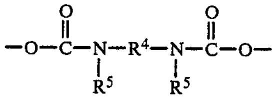

(VII)

and

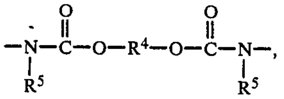

(VIII)

wherein $R^4$ is as previously defined and $R^5$ is hydrogen or a $C_{1-12}$ alkyl, cycloalkyl or aromatic hydrocarbon radical or both $R^5$ radicals taken together form a $C_{2-12}$ alkylene radical, and n is from 1 to 3 and preferably 1. When both $R^5$'s are alkylene (generally applicable to formula VII), they and $R^4$ are usually each an ethylene or hydrocarbon-substituted ethylene radical.

(3) Polyimide-polycarbonates in which $Z^1$ has the formula

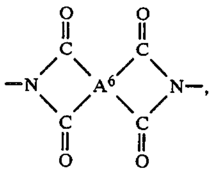

(IX)

wherein $A^6$ is a tetravalent aromatic radical, and n is 1. Suitable $A^6$ values include monocyclic radicals such as that derived from pyromellitic acid; bicyclic radicals such as those derived from the biphenyl-, benzophenone-, diphenyl sulfide and diphenyl sulfone tetracarboxylic acids; and radicals derived from the 2,2-bis[4-(dicarboxyphenoxy)phenyl]propanetetracarboxylic acids, especially the 3,4-dicarboxyphenoxy acid whose dianhydride is frequently and hereinafter designated "bisphenol A dianhydride".

(4) Polyether-polycarbonates in which $Z^1$ has the formula $$—O—A^7—Z^2—A^7—O— \qquad (X)$$

wherein $A^7$ is a $C_{6-12}$ divalent aromatic radical and $Z^2$ is CO or $SO_2$, and n has an average value of 1-3. Most often, $A^4$ and $A^7$ are both m- or p-phenylene.

(5) Polyamide-polycarbonates in which $Z^1$ has the formula

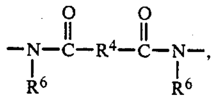

(XI)

wherein $R^4$ is as previously defined and $R^6$ is hydrogen or a primary or secondary $C_{1-4}$ alkyl radical and is preferably hydrogen or methyl, and n is 1.

The value of the subscript m is from 1 to about 12, whereby the compositions include cyclic carbonate monomers and oligomers. The value of p is discussed more fully hereinafter. In any event, a total of up to about 12 carbonate (i.e., $CO_3$) moieties is present in each molecular species which is an essential constituent of the compositions of the invention.

The cyclic heterocarbonates may be prepared by essentially the method described hereinabove, from a composition comprising at least one compound of the formula $$Y^2—O—A^3\text{-}(Z^1—A^4)_n\text{-}O—Y^2 \qquad (XII)$$

or a mixture thereof with at least one compound of the formula $$Y^3—O—A^5—O—Y^3 \qquad (XIII)$$

wherein $A^3$, $A^4$, $A^5$, $Z^1$ and n are defined hereinabove, the $Y^2$ and $Y^3$ values in each compound are both H or

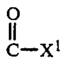

and X is as previously defined, with the proviso that at least one of $Y^2$ and $Y^3$ is

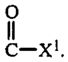

The preparation of cyclic polycarbonate and heterocarbonate oligomer compositions is illustrated by the following examples. All parts and percentages in the examples herein are by weight unless otherwise indicated. Temperatures are in degrees Celsius. Molecular weights are weight average unless otherwise indicated and were determined by gel permeation chromatography relative to polystyrene.

EXAMPLES 1-18

Bisphenol A bischloroformate was reacted with aqueous sodium hydroxide and triethylamine in an organic liquid (chloroform in Example 7, methylene chloride in all other examples) according to the following procedure: The bischloroformate was dissolved in half the amount of organic liquid employed and was added gradually, with slow stirring, to the balance of the reaction mixture. In Examples 1-10 and 12, the triethylamine was all originally present in the reaction vessel; in Examples 14-16, it was added gradually at the same time as the bischloroformates; and in Examples 11, 13, 17 and 18, it was added in equal increments at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymer was precipitated by addition of acetone.

The reaction conditions for Examples 1–18 are listed in Table I together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE 1

| Example | Bischloroformate amt., mmole/l. org. liquid | Bischloroformate amt., total mmol. | NaOH molarity | Molar ratio, amine: bischloroformate | Temperature | Addition time, min. | % oligomer in product |
|---|---|---|---|---|---|---|---|
| 1 | 100 | 2 | 0.313 | 0.5 | 20 | 30 | 97 |
| 2 | 100 | 2 | 0.625 | 0.5 | 20 | 30 | 95 |
| 3 | 100 | 2 | 2.5 | 0.5 | 35 | 55 | 93 |
| 4 | 100 | 2 | 2.5 | 0.5 | 0 | 30 | 77 |
| 5 | 100 | 2 | 2.5 | 0.5 | 20 | 30 | 87 |
| 6 | 100 | 2 | 2.5 | 0.5 | 35 | 30 | 78 |
| 7 | 100 | 2 | 2.5 | 0.5 | 50 | 30 | 88 |
| 8 | 100 | 2 | 2.5 | 0.25 | 20 | 30 | 74 |
| 9 | 100 | 1 | 2.5 | 0.2 | 20 | 15 | 75 |
| 10 | 200 | 4 | 2.5 | 0.5 | 20 | 30 | 88 |
| 11 | 500 | 10 | 2.5 | 0.25 | 25 | 105 | 83 |
| 12 | 500 | 10 | 2.5 | 0.25 | 25 | 105 | 78 |
| 13 | 500 | 10 | 2.5 | 0.25 | 25 | 105 | 83 |
| 14 | 500 | 10 | 2.5 | 0.25 | 25 | 105 | 87 |
| 15 | 500 | 10 | 2.5 | 0.29 | 30 | 90 | 78 |
| 16 | 500 | 10 | 2.5 | 0.25 | 30 | 20 | 75 |
| 17 | 500 | 10 | 2.5 | 0.25 | 40–45 | 105 | 79 |
| 18 | 500 | 10 | 2.5 | 0.4 | 25 | 105 | 79 |

EXAMPLE 19

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueous sodium hydroxide concentration was 5.0M and the reaction temperature was about 25° C. The product comprised 85% cyclic oligomer.

EXAMPLE 20

A crude bisphenol A bischloroformate product was analyzed as follows:

| | |
|---|---|
| Monomer bischloroformate | 58% |
| Dimer bischloroformate | 26% |
| Trimer bischloroformate | 10% |

and had an average degree of polymerization of about 1.5. An amount thereof containing 800 mmol. of monomer and oligomer bischloroformates, calculated as monomer bischloroformate, dissolved in one-half the total amount of methylene chloride used, and 450 ml. of 5M aqueous sodium hydroxide were added over 37 minutes, with stirring, to a reaction vessel containing the balance of the methylene chloride. The total amount of bischloroformate was 400 mmol. per liter of methylene chloride. Triethylamine, 200 mmol., was added in equal increments at intervals of 25% during bischloroformate addition. The peak reaction temperature was 37°. Upon workup as in Examples 1–18, there was obtained a product comprising 82% cyclic polycarbonate oligomer.

EXAMPLE 21

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux, with stirring, as 40 ml. of a 1.06M solution of the bischloroformate in methylene chloride was added over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

EXAMPLE 22

A solution in a 20:1 (by volume) mixture of methylene chloride and tetrahydrofuran of 57.07 grams (250 mmol.) of bisphenol A and 10.1 grams (100 mmol.) of triethylamine was cooled to 0° C. and a solution of 10.2 grams (50 mmol.) of isophthaloyl chloride was added over 15 minutes, with stirring. The reaction mixture was allowed to warm to room temperature and quenched with 3M aqueous hydrochloric acid. The organic phase was separated, washed with dilute hydrochloric acid and water and vacuum stripped. The residue was extracted with methylene chloride to separate the product from unreacted bisphenol A and the resulting solution was again vacuum stripped. Additional unreacted bisphenol A was removed by extraction of the product with heptane in a Soxhlet extractor. The product was shown by infrared and nuclear magnetic resonance spectroscopy and high pressure liquid-liquid chromatography to comprise 75% (by weight) bis(bisphenol A) isophthalate monomer, 21% dimer, 3% trimer and 1% tetramer.

A solution of 8.5 grams (14.5 mmol.) of crude bis(bisphenol A) isophthalates in 100 ml. of methylene chloride was cooled to 0° C. under nitrogen, with stirring, and phosgene was passed in at 1 gram per minute for 4 minutes (total 40 mmol.). There was then slowly added at 0° C., with continued stirring, 4.5 grams (30 mmol.) of diethylaniline. The mixture was allowed to warm to room temperature over 2 hours and was sprayed with nitrogen to remove excess phosgene. It was washed with dilute aqueous hydrochloric acid and water, extracted with methylene chloride, dried and vacuum stripped to yield the desired crude bischloroformate as an oil.

A mixture of 5 ml. of methylene chloride, 2 ml. of 5M aqueous sodium hydroxide solution and 0.2 ml. of triethylamine was heated to reflux, with stirring, and a methylene chloride solution of the entire portion of crude bischloroformates was added over 3 minutes. At the same time, 3 ml. of 5M aqueous sodium hydroxide and 0.02 ml. of triethylamine were added incrementally in 5 portions. When addition was complete, the organic and aqueous phases were separated and the aqueous phase was washed with a small portion of methylene chloride. The combined organic phases were washed three times with dilute aqueous hydrochloride acid and once with water, dried and evaporated to yield the desired cyclic polyester-carbonate oligomer composition as a white powder. High pressure liquid-liquid chromatographic analysis showed the absence of cyclic homopolycarbonates and linear oligomers, and the presence of about 4% high polymer.

EXAMPLE 23

The procedure of Example 22 was repeated, substituting adipoyl chloride on an equimolar basis for the isophthaloyl chloride. A similar product was obtained.

EXAMPLE 4

A mixture of 50 mmol. of 2-(4-hydroxyphenyl)-2-(4-methylaminophenyl)propane, 50 mmol. of sodium bicarbonate, 500 ml. of water and 50 ml. of methylene chloride was mixed at high speed in a blender as a solution of 25 mmol. of isophthaloyl chloride in 25 ml. of methylene chloride was added over 5 minutes. Blending was continued for 10 minutes, yielding a heterogeneous mixture which was extracted with ethyl acetate. Upon vacuum stripping, the desired bisamide bisphenol was obtained.

A mixture of 6.12 grams (10 mmol.) of the bisamide bisphenol and 50 ml. of methylene chloride was cooled to 0° C. and phosgene was passed in at 1 gram per minute for 3 minutes. A solution of 3 grams (20 mmol.) of diethylaniline in methylene chloride was then added slowly, with stirring, as the temperature was maintained at 0° C. The mixture was allowed to warm to room temperature over 15 minutes and stirred for one additional hour. Toluene, 50 ml., was then added with stirring and the mixture was sparged with nitrogen to remove excess phosgene and methylene chloride. The toluene solution was washed with dilute aqueous hydrochloric acid and water, yielding the crude bischloroformate.

A solution of the crude bischloroformate in 10 ml. of methylene chloride was added over 35 minutes, with stirring, to a refluxing mixture of 25 ml. of methylene chloride, 1 ml. of 5M aqueous sodium hydroxide solution and 0.1 ml. of triethylamine. There were simultaneously added in equal portions, at 7-minute intervals 4 ml. of 5M aqueous sodium hydroxide solution and 0.11 ml. of triethylamine. Upon workup substantially as described in Example 22, the cyclic bisamide carbonate oligomer mixture, melting in the range of 140°-160° C., was obtained. It was shown by high pressure liquid-liquid chromatographic analysis to comprise 2.9% monomer, 43.2% dimer, 21.35% trimer, 9.42% tetramer and minor amounts of higher oligomers.

EXAMPLE 25

A mixture of 100.37 grams (192.8 mmol.) of bisphenol A dianhydride, 42.08 grams (385.6 mmol.) of m-aminophenol and 500 ml. of glacial acetic acid was heated under reflux for 4 hours, after which the acetic acid was removed by vacuum stripping, yielding a white solid which was collected by filtration and washed with cold methanol. The product was shown by elemental analysis to be the desired bisphenol A bis-N-(3-hydroxyphenyl)imide.

A solution in 200 ml. of methylene chloride of 12.56 grams (17.9 mmol.) of the above-described bisimide was cooled to 0° C. and 5.3 grams (53.7 mmol.) of phosgene was metered in under the surface. A solution of 8 grams (53.68 mmol.) of diethylaniline in 20 ml. of methylene chloride was added over 15 minutes, with stirring and continued cooling. An exothermic reaction took place and the temperature rose to 8° C. Stirring was continued for 1 hour at 8° C. and for 1 hour at room temperature, after which the solution was sparged with nitrogen for 1 hour to remove excess phosgene. It was then diluted with 100 ml. of methylene chloride, washed three times with dilute aqueous hydrochloric acid and once with aqueous sodium chloride solution, dried over anhydrous magnesium sulfate, filtered and vacuum stripped to yield the bisimide bischloroformate as a glassy solid.

A mixture of 15 ml. of methylene chloride, 0.1 gram of triethylamine, 0.3 ml. of 5M aqueous sodium hydroxide solution and 1 ml. of water was heated at 40° C., with stirring. There were separately added over ½ hour a solution of 5 grams of the bisimide bischloroformate in 5 ml. of methylene chloride, 2.7 ml. of 5M aqueous sodium hydroxide solution and a solution of 52 mg. of triethylamine in 2 ml. of methylene chloride. When the addition was completed, the mixture was cloudy. Refluxing was continued for 10 minutes, after which the mixture was diluted with 100 ml. of chloroform and 50 ml. of methylene chloride. The cloudy organic layer was washed twice with dilute aqueous hydrochloric acid and once with aqueous sodium chloride solution, dried over magnesium sulfate and filtered. The filtrate was vacuum stripped to yield a tan glassy solid. It was shown by high pressure liquid-liquid chromatography to comprise 65% cyclics and 35% high polymer; the structure of the cyclic product was shown by field desorption mass spectrometry to correspond generally to the formula

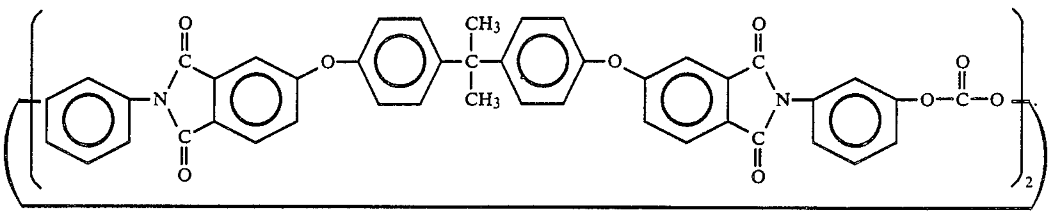

nuclear magnetic resonance spectroscopy to be the desired bisurethane bischloroformate.

A solution of 1 mmol. of the bisurethane bischloroformate in 10 ml. of methylene chloride was added over 30 minutes to a stirred mixture of 20 ml. of methylene chloride, 2 ml. of 1M aqueous sodium hydroxide and 40 mg. (0.4 mmol.) of triethylamine. After addition was complete, the sample was worked up as described in Example 22. High pressure liquid-liquid chromatographic analysis showed the existence of the desired cyclic bisurethane carbonate.

EXAMPLE 26

To 50 ml. of a 1M solution in methylene chloride of bisphenol A bischloroformate (50 mmol.) maintained at 0° C., was added slowly, with stirring, a solution of 1.94 grams (10 mmol.) of piperazine hexahydrate in 10 ml. of a mixture of equal volumes of tetrahydrofuran and water. Stirring was continued for 15 minutes, after which the organic layer, comprising a solution of bisurethane and bisphenol bischloroformates, was withdrawn and added over 30 minutes to a slowly stirred mixture of 200 ml. of methylene chloride, 50 ml. of 2.5M aqueous sodium hydroxide solution and 2.5 grams of triethylamine. When addition was complete, the product was worked up as described in Example 1. There was obtained the desired cyclic bisurethane carbonate product. It was shown by high pressure liquid-liquid chromatography, after removal of high polymer by precipitation with acetone, to comprise mixed cyclics and by field desorption mass spectrometry to contain substantial proportions of compounds of the formula

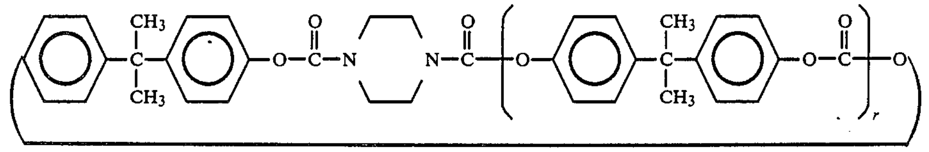

wherein r is 1 and 2 (i.e., p is 0 and 1).

EXAMPLE 27

The procedure of Example 26 was repeated, using a bischloroformate mixture corresponding to a 7:1 molar ratio of bisphenol A bischloroformate to bisurethane bischloroformate. A mixed cyclic polycarbonate product containing cyclic polyurethane carbonates was obtained.

EXAMPLE 28

Triethylamine, 2.2 grams (20 mmol.), was slowly added at 0° C., with stirring, to a solution of 10.5 grams (30 mmol.) of bisphenol A bischloroformate in 50 ml. of methylene chloride. There was then added over 15 minutes a solution of 2.5 grams of 85% pure N,N'-diphenylethylenediamine (10 mmol.) in 20 ml. of methylene chloride. The mixture was stirred for 10 minutes, washed with dilute aqueous hydrochloric acid, dried and vacuum stripped, yielding a tan solid. A sample of the product was dissolved in methylene chloride, precipitated with hexane, redissolved in methylene chloride and vacuum stripped to yield a light brown crystalline solid which was shown by infrared and proton

EXAMPLE 29

A solution of 51 mg. (0.25 mmol.) of bis(4-aminophenyl)methane in 2 ml. of methylene chloride was added at 0° C. over 15 minutes, with stirring, to a methylene chloride solution of 1.56 grams (3 mmol.) of bisphenol A bischloroformate and 100 mg. (1 mmol.) of triethylamine. The organic phase was added over 25 minutes to a mixture of 10 ml. of methylene chloride, 2 ml. of 1M aqueous sodium hydroxide solution and 50 mg. of triethylamine. Upon workup as described in Example 22, the desired cyclic bisurethanecarbonate was obtained.

EXAMPLE 30

A solution of 10 mmol. of 2-(4-hydroxyphenyl)-2-(4-methylaminophenyl)propane and 5 mmol. of bisphenol A bischloroformate in 50 ml. of methylene chloride was placed in a small blender and agitated for 10 minutes, during which time a precipitate formed. There was then added a solution of 15 mmol. of sodium carbonate in 50 ml. of water, and the mixture was blended for an additional 1½ hours. The organic layer was separated, dried with phase separation paper and stripped in a rotary evaporator to yield a fluffy white solid. The solid was washed twice with hexane, dissolved in a small amount of methylene chloride and precipitated slowly by the addition of ethyl ether. The precipitate was filtered, washed twice with ether and dried to yield the desired bisurethane condensation product of bisphenol A and N-methyl-N-{4-[2-(4-hydroxyphenylpropyl)]}phenylcarbamic acid.

Following a procedure similar to that of Example 28, the above product was converted to bischloroformate and cyclized to yield the desired bisurethane carbonate oligomer mixture.

EXAMPLE 31

The procedure of Example 30 was repeated, substituting hydroquinone bischloroformate on an equimolar basis for the bisphenol A bischloroformate. A similar product was obtained.

EXAMPLE 32

The procedure of Example 30 was repeated, substituting resorcinol bischloroformate on an equimolar basis for the bisphenol A bischloroformate. A bisurethane which was soluble in ethyl ether was obtained and was converted to bischloroformate and cyclized to a bisurethane carbonate oligomer mixture by the procedure of Example 24.

EXAMPLE 33

A mixture of 114 grams (0.5 mole) of bisphenol A, 1 mole of potassium hydroxide and just enough water to effect solution was heated at 100° C. under nitrogen and 200 ml. of benzene was added; refluxing was maintained as the water was removed as a benzene-water azeotrope. After the potassium salt of bisphenol A began to precipitate, 500 ml. of dimethyl sulfoxide was added and azeotroping was continued until all the water was removed. The solution was maintained at 100° C. under nitrogen as a solution of 80 grams (0.279 mole) of bis(4-chlorophenyl)sulfonyl in toluene was added. The temperature of the mixture was then increased to 150° C. and the toluene was removed by distillation. After 3 hours of heating, no further sulfone could be detected by high pressure liquid-liquid chromatography. The hot solution was poured into 2 liters of 0.5M aqueous hydrochloric acid in a blender, whereupon a white solid precipitated. It was removed by filtration, returned to the blender and washed twice with distilled water to yield a mixture of oligomeric ethersulfone bisphenols, shown by high pressure liquid-liquid chromatographic analysis to contain 22.7% monomer, 20.6% dimer, 14.7% trimer, 8.7% tetramer, 7.1% pentamer and minor amounts of higher oligomers.

A mixture of 33.5 grams of oligomeric ethersulfone bisphenols, 100 ml. of methylene chloride and 20 ml. of water was stirred and cooled to 15° C. Phosgene was passed into the mixture at 1 gram per minute for 12 minutes (total 120 mmol.) and 5M aqueous sodium hydroxide solution was added to maintain the pH in the range of 2–4 (total sodium hydroxide 25 ml.). When the addition was complete, the organic phase was washed with dilute aqueous hydrochloric acid and a saturated aqueous sodium chloride solution, filtered and vacuum stripped to yield the desired oligomeric bischloroformate.

A mixture of 75 ml. of methylene chloride, 0.70 ml. of triethylamine and 4 ml. of 5M aqueous sodium hydroxide solution was heated under reflux and stirred as a solution of the above-prepared bischloroformate in 50 ml. of methylene chloride was added over 35 minutes. At the same time, 0.7 ml. of triethylamine and 21 ml. of 5M aqueous sodium hydroxide solution was added in 7 equal portions at 5-minute intervals. When reagent addition was complete, the mixture was stirred for 5 minutes and the organic phase was worked up substantially as in Example 22. There was obtained an off-white solid which was shown to comprise 16% high polymer, with the balance being cyclic polyethersulfone carbonate oligomers.

EXAMPLE 34

A solution of 50 mmol. of bisphenol A monotetrahydropyranyl ether monosodium salt (prepared as described in U.S. Pat. No. 4,273,717) and 25 mmol. of 4,4'-difluorobenzophenone in 150 ml. of dimethylformamide was heated at 100° C. for 2 hours. The reaction mixture was poured into 1.0M aqueous hydrochloric acid and the desired ether ketone bisphenol was precipitated by addition of tetrahydrofuran.

A solution of 10 mmol. of the ether ketone bisphenol in 20 ml. of methylene chloride was cooled to 0° C. and 25 mmol. of phosgene was bubbled through over 5 minutes. Dimethylaniline, 20 mmol., was then added at 0° C. with stirring, causing a blue coloration in the mixture. Stirring at 0° C. was continued for 15 minutes, after which the mixture was sparged with nitrogen to remove excess phosgene and allowed to warm to room temperature. It was washed with 1.0M aqueous hydrochloric acid and vacuum stripped in a rotary evaporator to yield a blue oil, which was shown by derivatization with phenol and triethylamine followed by high pressure liquid chromatographic analysis to be the desired etherketone bischloroformate.

A mixture of 15 ml. of methylene chloride, 1.5 mmol. of triethylamine and 1.5 ml. of 5.0M aqueous sodium hydroxide was heated to reflux, with stirring, and a solution of the ether ketone bischloroformate in 15 ml. of methylene chloride was added. There were also added an additional 1.65 mmol. of triethylamine and 3.5 ml. of aqueous sodium hydroxide solution in five equal portions at 5-minute intervals. After addition was complete, the mixture was stirred for 5 minutes and the organic phase was separated and washed twice with aqueous hydrochloric acid solution, once with water and once with aqueous sodium chloride solution. It was then dried over magnesium sulfate, filtered and evaporated, yielding a blue solid which was decolorized by dissolution and column chromatography through an activated charcoal-silica gel combination. The product was the desired polyetherketone carbonate oligomer mixture.

Reagent B is at least one acyclic polymer other than a polycarbonate. When used with reference to reagent B, the word "acyclic" means that the polymer has at least two end groups per molecule; that is, that it does not have an overall cyclic structure similar to that of reagent A. However, many of the polymers useful as reagent B have cyclic moieties therein, as will be apparent hereinafter.

Said polymer may have a chain comprising principally carbon atoms, and optionally also containing hetero atoms such as oxygen, nitrogen and sulfur. Also useful are various polymers with non-carbon-containing chains, such as polysiloxanes.

A critical aspect of reagent B is the presence of nucleophilic moieties which are effective to ring-open the cyclic molecules of reagent A. A wide variety of nucleophilic moieties have this capability; the following are examples.

(1) "Living" anionic vinyl polymers of such monomers as ethylene, propylene, acrylonitrile, styrene and substituted styrenes. (The term "living" is known in the art to designate an anionic polymer moiety capable of undergoing further polymerization.)

(2) Polymers containing at least one deprotonated hydroxy or carboxy group, usually at least two which are end groups; however, said groups may occur along the polymer chain. The hydroxy groups may be substituents on alkyl, cycloalkyl or aryl groups. Examples are salts of polyphenylene ethers and of hydroxyaryl-terminated polyimides.

(3) Polymers containing at least one neutral nucleophilic moiety such as an amine or phosphine group, especially the former. As in (2), there are usually more than one such group. They are most often end groups but may occur along the polymer chain. Examples are secondary amine-terminated polyimides, polyethersulfones and polyetherimides.

(4) Anionic polymers of ring-opened compounds, such as polyamides from lactams, polyesters from lactones and polysiloxanes from cyclic siloxane compounds.

The methods of preparing anionic polymers of these types are known to those skilled in the art, and any such methods may be used.

Anionic polymers of any of the above types, and other species of such polymers, may be reacted with cyclic polycarbonate oligomer compositions in accordance with this invention. The structures of the products will vary with the identity of reagent B; block copolycarbonates are produced in some instances, and random copolymers in others.

Because of the wide diversity of materials useful as reactants in the method of this invention, it is not possible to define reaction conditions which are universally applicable. Hereinafter there are described several varieties of polymers useful as reagent B, with reaction conditions and parameters and specific examples relating to each.

Polyphenylene ethers: These polymers, also known as polyphenylene oxides, are well known and widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

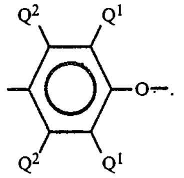

(XIV)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.2–0.6 and preferably 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Many polyphenylene ethers comprise molecules having at least one of the end groups of the formulas

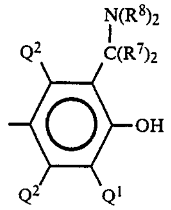
(XV)

and

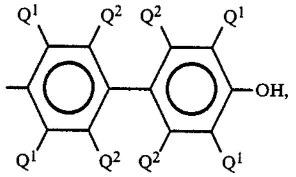
(XVI)

wherein $Q^1$ and $Q^2$ are as previously defined; each $R^7$ is independently hydrogen or alkyl, with the proviso that the total number of carbon atoms in both $R^7$ radicals is 6 or less; and each $R^8$ is independently hydrogen or a $C_{1-6}$ primary alkyl radical. Preferably, each $R^7$ is hydrogen and each $R^8$ is alkyl, especially methyl or n-butyl.

Polymers containing the aminoalkyl-substituted end groups of formula XV may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

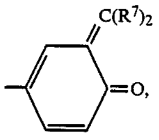
(XVII)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula XVI are typically obtained from reaction mixtures in which a by-product diphenoquinone of the formula

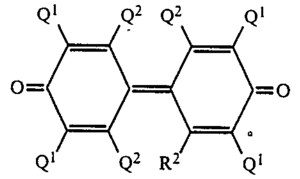
(XVIII)

is present, especially in a copper-halide-secondary or tertiary amine system. In this regard, the disclosures of U.S. Pat. Nos. 4,234,706, 4,477,649 and 4,482,697 are particularly pertinent and are incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas XV and XVI. Under certain conditions, such as relatively high temperatures, blocks involving groups of formula IV may be relatively unstable. If it is desired to avoid the formation of such end groups, an oxidative coupling catalyst other than one which leads to their formation may be used or the aminoalkyl end groups may be inactivated by chemical treatment. It should be noted, however, that salt formation and the reaction leading to the block polyphenylene ether-polycarbonate may be undergone by hydroxy-containing end groups of a higher degree of stability in the same or different polymer molecules. Therefore, the presence of aminoalkyl end groups does not foreclose the practice of this invention.

It will be apparent to those skilled in the art from the foregoing that the polyphenylene ethers contemplated for use in the present invention include all those presently known, irrespective of variations in structural units or ancillary chemical features.

For the purposes of the present invention, the polyphenylene ether is converted into a salt thereof. The site of salt formation is the terminal hydroxy group(s). The salt must be substantially anhydrous when used, since water will react adversely with cyclic polycarbonate oligomers.

Suitable salts may be prepared by reacting the polyphenylene ether with a strong base in a non-aqueous medium, typically in solution in an organic liquid such as toluene, xylene, chlorobenzene, o-dichlorobenzene, dichlorotoluene, dimethylformamide, dimethylacetamide, dimethyl sulfoxide or N-methylpyrrolidone. Alkali metal, alkaline earth metal and tetrakis(amino)phosphonium salts are often preferred. The latter are particularly suitable by reason of the high nucleophilicity of iminotriaminophosphorines, which can deprotonate an organic acidic compound and delocalize the resulting positive charge among a phosphorus atom and four adjacent nitrogen atoms. Suitable strong bases include polar compounds such as sodamide, sodium hydride and sodium benzophenone ketyl, and non-polar compounds such as pentamethylguanidine and 2-t-butylimino-2-diethylamino-1,3-dimethylperhydro-1,3,2-diazaphosphorine. The latter compound is disclosed in Schwesinger, *Chimia*, 39, 269–272 (1985).

To ensure quantitative formation of the polyphenylene ether salt, it is frequently advantageous to employ a highly colored basic compound and to titrate the polyphenylene ether by adding said compound until its color persists in the reaction mixture. Suitable highly colored compounds of this type are the aforementioned alkali metal benzophenone ketyls as well as alkali metal salts of triphenylmethane, both disclosed in U.S. Pat. Nos. 3,402,143 and 3,703,564.

The polyphenylene ether salt is an effective initiator for polymerization of the cyclic polycarbonate oligomers to high molecular weight linear polycarbonates. In the initiation process, the first carbonate moiety becomes bonded to the polyphenylene ether whereby the desired block copolymer is formed. In order to minimize homopolycarbonate formation, it is generally preferred to preform the polyphenylene ether salt and subsequently to contact it with the cyclic oligomers. However, it is also within the scope of the invention to initially blend the cyclic oligomers with the polyphenylene ether and subsequently to add the desired base.

The reaction between the polyphenylene ether salt and the cyclic oligomers typically takes place at a temperature within the range of about 175°-300° C., preferably about 190°-260° C. It may be conducted in solution or in the melt, usually in solution in a solvent such as those previously described with reference to polyphenylene ether salt formation and advantageously in the same solvent when it boils within the desired reaction range, or in the melt. The choice of proportions of polyphenylene ether and cyclic oligomer may be made as known in the art to produce a block copolymer of the desired stoichiometry and molecular weight range. Most often, the number average molecular weight of the block copolymer, as determined by gel permeation chromatography relative to polystyrene, will be in the range of about 5,000-75,000. The reaction mixture may also contain an endcapping agent such as diphenyl carbonate or a substituted diphenyl carbonate, in an amount to provide a polycarbonate block of the desired molecular weight.

Following block copolymer formation, the copolymer may be isolated as necessary by known methods. These typically include separation of the block copolymer from any polyphenylene ether homopolymer, most often by dissolving the latter in a suitable solvent such as toluene and separating it from the insoluble block copolymer by filtration.

The block polyphenylene ether-polycarbonates formed by the method of this invention may be A-B (diblock) or A-B-A (triblock) copolymers, depending on the number and stability of the hydroxy end groups on the polyphenylene ether. Thus, diblock copolymers are formed if the polyphenylene ether is a conventional head-to-tail polymer containing only one hydroxy end group, and may also be formed if one of two hydroxy end groups is an aminoalkyl-substituted group as described hereinabove. On the other hand, triblock copolymers can be obtained by the use of polyphenylene ethers containing two stable hydroxy end groups, such as those prepared by quinone coupling of a conventional head-to-tail polymer.

Since the conversion of the cyclic polycarbonate oligomer to a linear polycarbonate is a "living" polymerization, it is possible to form B-A-C block copolymers by adding a third reactive polymer or precursor thereof after polycarbonate formation has proceeded to the extent desired. Suitable reactive polymers for this purpose are polysiloxanes, polyesters and polyamides. Polyamide- and polyether-containing block copolymers may also be prepared by combining the "living" polymer with a reactive lactam such as ε-caprolactam or an epoxide such as ethylene oxide or propylene oxide.

Polyimide bisphenols: Block copolyimidecarbonates may be prepared using as reagent B a salt of a polyimide bisphenol of the formula (XIX)

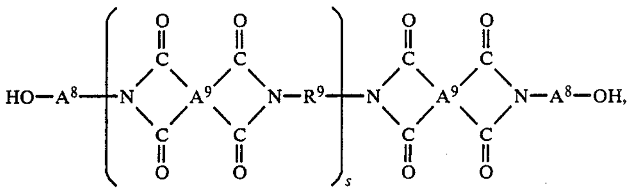

wherein $A^8$ is a divalent aromatic radical; $A^9$ is a tetravalent aromatic radical; $R^9$ is an aromatic hydrocarbon radical containing about 6-20 carbon atoms, an alkylene or cycloalkylene radical containing about 2-20 carbon atoms, or a bis-alkylenepoly(dialkylsilloxane) radical; and s is from 1 to about 100.

The $A^8$ values are divalent aromatic radicals, preferably hydrocarbon and substituted hydrocarbon radicals as illustrated by p-phenylene, m-phenylene, p-tolylene and chloro-, nitro- and acyl-substituted derivatives thereof. The aromatic hydrocarbon radicals, especially p-phenylene and m-phenylene, are preferred.

The $A^9$ values may be tetravalent aromatic hydrocarbon radicals or radicals contaning non-hydrocarbon substituents and/or hetero atoms such as oxygen, nitrogen, sulfur, phosphorus and silicon. Most often, $A^9$ contains a plurality of aromatic moieties separated by bridging groups such as alkylene, oxy, sulfone, carbonyl, phenylene and combinations thereof.

The preferred $A^9$ radicals are those having the formula (XX)

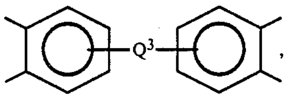

wherein $Q^3$ is a single bond or a divalent bridging group. The identity of the bridging group is immaterial so long as it does not substantially alter the character or reactivity of the $A^9$ moiety. Illustrative bridging groups are $-CH_2-$, $-C_2H_4-$, $-C(CH_3)_2-$, $-C(CF_3)_2-$, $-O-$,

$-S_z-$, $-SO_2-$, $-OR^{10}-O-$, $-S-R^{10}-S-$ and $-SO_2R^{10}-SO_2-$, wherein z is 1 or 2 and $R^{10}$ is a divalent aliphatic or aromatic radical, particularly a hydrocarbon radical.

The preferred bridging group is —O—$R^{10}$—O—, wherein $R^{10}$ is aromatic. Illustrative $R^{10}$ values are those having the formulas

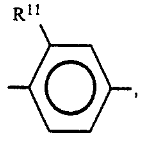

(XXI)

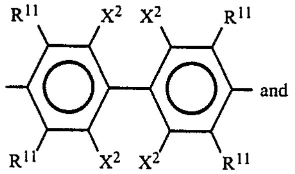

and (XXII)

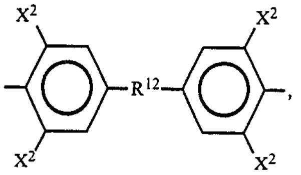

(XXIII)

wherein each $R^{11}$ is independently hydrogen or methyl; $R^{12}$ is a straight chain or branched alkylene radical containing 1-5 carbon atoms, —O—, —S—, —$SO_2$—,

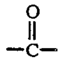

or —$C(CF_3)_2$— and is most often the isopropylidene radical; and each $X^2$ is independently hydrogen or halogen (usually chlorine or bromine). Mixtures of the foregoing formulas are also contemplated. Especially preferred is the radical derived from bisphenol A [i.e., 2,2'-bis(4-hydroxyphenyl)propane] by the removal of both hydroxy groups therefrom and having formula XXIII wherein $R^{12}$ is isopropylidene and each $X^2$ is hydrogen.

The $R^9$ value is as previously defined and may be considered as being derived from a diamine of the formula $$H_2N—R^9—NH_2 \quad (XXIV)$$

Examples of suitable $R^9$ values are those in such diamines as ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3'-dimethylbenzidine, 3,3'-dimethoxybenzidine, 1,5-diaminonaphthalene, bis(4-aminophenyl)methane, bis(4-aminophenyl)propane, 2,4-bis(β-amino-t-butyl)toluene, bis(p-β-methyl-o-aminopentyl)benzene, 1,3-diamino-4-isopropylbenzene, bis(4-aminophenyl)sulfone, bis(4-aminophenyl)ether and 1,3-bis(3-aminopropyl)tetramethyldisiloxane. Mixtures of these $R^9$ values may also be present. Preferably, $R^9$ is an aromatic hydrocarbon radical; the m-phenylene and bis(4-phenylene)methane radicals are particularly preferred.

Polyimide bisphenols of formula XIX include the polyetherimide bisphenols disclosed in copending, commonly owned application Ser. No. 891,014, filed July 31, 1986, and may be prepared as described therein. In brief, the methods of preparation include the reactions of dianhydrides and certain bisimides with mixtures of aminophenols and diamines. Such methods involving dianhydrides are disclosed in a large number of United States patents and other literature references. Methods involving certain bisimides are disclosed, for example, in U.S. Pat. No. 4,578,470, the disclosure of which is incorporated by reference herein.

The dianhydrides and bisimides may be represented by the formula

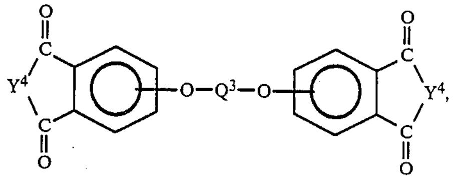

wherein $Y^4$ is oxygen or N—$Z^3$, $Z^3$ is a highly electron-deficient group and $Q^3$ is as previously defined. Similarly, the aminophenols may be represented by the formula HO—$A^8$—$NH_2$.

The reaction leading to the polyimide bisphenols, involving the above-described dianhydrides or bisimides, aminophenols and diamines, may be conducted under conventional conditions, using appropriate mole ratios of reagents and conventional reaction media. Such reactions are illustrated by the following example.

EXAMPLE 35

A solution of 261.22 grams (504 mmol.) of 2,2,bis[4-(3,4-dicarboxyphenoxy)phenyl]propane dianhydride in 600 ml. of o-dichlorobenzene was heated to 190° C. There was then added, with stirring, a mixture of 50.86 grams (471 mmol.) of m-phenylenediamine, 6.83 grams (63 mmol.) of p-aminophenol and 60 mg. of sodium phenylphosphinate. Heating and stirring were continued at 190°-200° C. as water of reaction of removed by azeotropic distillation, and then for an additional 3 hours; the mixture was then cooled to room temperature. Methylene chloride, 400 ml., was added and the product was precipitated by pouring into methanol, filtered and dried in vacuum at 160° C. There was obtained the desired polyetherimide bisphenol having a weight average molecular weight, as determined by gel permeation chromatography, of about 17,800, corresponding to a polymer of the formula

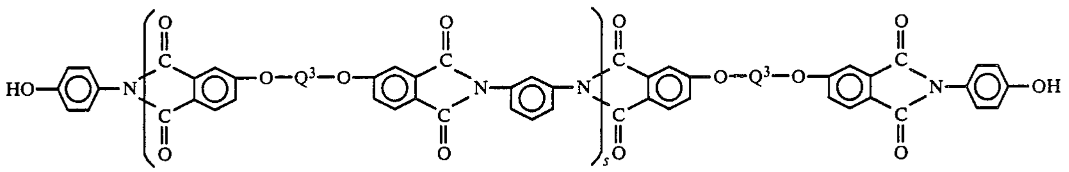

wherein $Q^3$ is derived from bisphenol A and s is about 12.

To prepare the block copolyimidecarbonates, the salt of the polyimide bisphenol is prepared in a manner similar to those previously described for polyphenylene ether salts and is contacted with the cyclic polycarbonate oligomer composition in an anhydrous medium, typically in the melt or in solution in the liquid in which said salt was prepared, at a temperature in the range of about 20°-300° C. Reactant ratios are not critical and may be adjusted to provide a product with the desired properties. A weight ratio of bisphenol salt to oligomer mixture in the range of about 0.1-10:1 is typical.

Secondary amine-terminated polymers: These materials, convertible tó block copolyurethanecarbonates by the method of this invention, typically have the formula $$R^{13}—NH—A^{10}\!\left(Z^4A^{11}Z^4A^{12}\right)_t Z^4A^{11}—Z^4—A^{10}—NHR^{13} \qquad (XXV)$$

wherein:

$R^{13}$ is $C_{1-4}$ alkyl or phenyl;

each of $A^{10}$, $A^{11}$ and $A^{12}$ is independently an aromatic radical, with $A^{10}$ and $A^{12}$ being divalent and $A^{11}$ being divalent or tetravalent;

$Z^4$ is a bridging radical containing at least one non-carbon linking atom; and t is from 0 to about 20.

The secondary amine-terminated polymers are characterized by structural units which may contain any known aromatic moieties. Examples of such moieties are given hereinafter. Aromatic structural units containing non-carbon linking atoms are included. The preferred polymers are polyimides, polyethersulfones and polyetherketones.

The $R^{13}$ values in the amine-terminated oligomers are $C_{1-4}$ alkyl or phenyl radicals. The alkyl radicals include methyl, ethyl, 1-propyl, 2-propyl, 1-butyl, 2-butyl, isobutyl and t-butyl. The methyl and phenyl radicals are preferred, with methyl frequently being most preferred because of the particular suitable of the methylamino-terminated oligomers for conversion to copolycarbonates.

The $A^{10}$ values are divalent aromatic radicals, preferably hydrocarbon and substituted hydrocarbon radicals as illustrated by p-phenylene, m-phenylene, p-tolylene and chloro-, nitro- and acyl-substituted derivatives thereof. The aromatic hydrocarbon radicals, especially p-phenylene and m-phenylene, are preferred.

The $A^{11}$ values include aromatic hydrocarbon radicals and radicals containing non-hydrocarbon substituents and/or hetero atoms such as oxygen, nitrogen, sulfur, phosphorus and silicon. They may be divalent or tetravalent. For example, typical polyethersulfone and polyetherketone oligomers contain divalent $A^{11}$ radicals, while typical polyimides contain tetravalent $A^{11}$ radicals. Most often, $A^{11}$ contains a plurality of aromatic moieties separated by bridging groups such as alkylene, oxy, sulfone or carbonyl.

The preferred $A^{11}$ radicals are those which have formula XX (i.e., are identical to $A^9$ as defined hereinabove) or one of the formulas

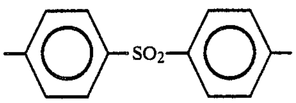

(XXVI)

and

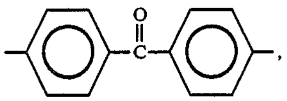

(XXVII)

with formula XX and the previously stated preferences for $Q^3$ therein again being preferred.

The $A^{12}$ values, like the $A^{10}$ values, are divalent aromatic radicals and usually aromatic hydrocarbon or substituted aromatic hydrocarbon radicals. Particularly preferred $A^{12}$ values are p-phenylene, m-phenylene and bis(4-phenylene)propane (i.e., the radical derived from bisphenol A).

The $Z^4$ radicals are bridging radicals containing at least one non-carbon linking atom. They may be single atoms or combinations of atoms including nitrogen, oxygen and sulfur. They are preferably oxygen atoms (e.g., in polyethersulfones and polyetherketones) or have the formula

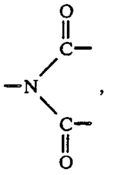

(XXVIII)

(e.g., in polyimides).

The value of t is from 0 to about 20, depending on the molecular weight of the secondary amine-terminated polymer. Most often, t is in the range of about 5-15.

Such secondary amine-terminated polymers may be prepared by utilizing compounds of the formula $R^{13}$-NH-$A^{10}$-$Y^5$H, wherein $A^{10}$ and $R^{13}$ are as previously defined and $Y^5$ is O or NH, as endcapping agents in conventional condensation reactions for the preparation of aromatic polymers such as polyimides, polyethersulfones and polyetherketones. The condensation polymerization reactions are those known in the art. Thus, polyimides are typically prepared by the reaction of aromatic dianhydrides with aromatic diamines, and polyetherketones and polyethersulfones by the reaction of bis-haloaryl ketones or sulfones with bisphenol salts.

Said amine-terminated polymers and the block copolyurethanecarbonates prepared therefrom are disclosed and claimed in the aforementioned application Ser. No. 877,623.

Incorporation of compounds such as N-phenyl-p-phenylenediamine or N-methyl-p-phenylenediamine in a reaction mixture including a dianhydride and an aromatic diamine will produce a secondary amine-terminated oligomeric polyimide of this invention. Similarly, incorporation of such compounds as the alkali metal salts of p-hydroxy-N-methylaniline, p-hydroxydiphenylamine or the corresponding m-hydroxy compounds in a reaction mixture including a di-alkali metal salt of bisphenol A and bis(p-chlorophenyl)sulfone or 4,4'-dichlorobenzophenone will produce a secondary amine-terminated polyethersulfone or polyetherketone of the invention. The proportion of endcapping agent may be determined conventionally, depending on the molecular weight desired for the oligomer. Most often, about 0.1–0.5 mole of endcapping agent is employed per mole of diamine or bisphenol salt. The conditions of the oligomer-forming reaction are otherwise conventional for the type of polymerization required.

The preparation of secondary amine-terminated oligomers is illustrated by the following examples. Intrinsic viscosities were determined in chloroform at 25° C.

EXAMPLE 36

A mixture of 33.31 grams (64 mmol.) of 2,2-bis[4-(3,4-dicarboxyphenoxy)phenyl]propane dianhydride, 6.4884 grams (60 mmol.) of m-phenylenediamine, 1.4738 grams (8 mmol.) of N-phenyl-p-phenylenediamine, 8 mg. of sodium benzenephosphinate and 100 ml. of o-dichlorobenzene was heated under reflux in a nitrogen atmosphere, with stirring, for 1 hour. An additional 100 ml. of o-dichlorobenzene was added in two increments as water was removed by azeotropic distillation over 4 hours. The mixture was cooled and diluted with 300 ml. of methylene chloride, and the product was precipitated by pouring into methanol. There was obtained the desired phenylamino-terminated polyetherimide oligomer.

EXAMPLE 37

A mixture of 11.06 grams (139.1 mmol.) of a 50.26% aqueous sodium hydroxide solution, 14.29 grams (62.6 mmol.) of bisphenol A, 2.58 grams (13.91 mmol.) of m-hydroxydiphenylamine, 66 ml. of dimethyl sulfoxide and 60 ml. of toluene was heated under nitrogen, with stirring, as water was removed azeotropically. The refluxing toluene was continuously dried by recirculation through a bed of molecular sieve followed by calcium hydride.

After it was thoroughly dry, the mixture was cooled to room temperature and 19.97 grams (69.55 mmol.) of bis(p-chlorophenyl)sulfone was added. The mixture was heated for 11 hours at 122°–126° C., cooled and poured into water. The tacky precipitate which formed was isolated, washed with water, dried and dissolved in 400 ml. of tetrahydrofuran. The solution was filtered and precipitated by pouring into a mixture of 350 ml. of methanol and 10 ml. of acetic acid. Upon filtration, there was obtained the desired phenylamino-terminated polyethersulfone oligomer; it had an intrinsic viscosity in chloroform at 25° C. of 0.15 dl./g. and a number average molecular weight of about 2900.

EXAMPLE 38

The procedure of Example 37 was repeated, substituting p-hydroxy-N-methylaniline on an equimolar basis for the m-hydroxydiphenylamine. The resulting methylamino-terminated polyethersulfone oligomer had an intrinsic viscosity of 0.15 and a number average molecular weight of about 2000.

EXAMPLE 39

A mixture of 8.42 grams (105.7 mmol.) of 50.26% aqueous sodium hydroxide solution, 10.68 grams (47.55 mmol.) of bisphenol A, 1.96 grams (10.57 mmol.) of p-hydroxydiphenylamine, 47 ml. of dimethyl sulfoxide and 30 ml. of toluene was heated under reflux in a nitrogen atmosphere, with stirring, and was dehydrated as described in Example 37. The solution was cooled and 13.27 grams (52.85 mmol.) of 4,4'-dichlorobenzophenone and 30 ml. of dimethyl sulfoxide were added. The mixture was heated at 130° C. for 20 hours and the product was precipitated by pouring into methanol, redissolved in tetrahydrofuran and precipitated again by pouring into water. Upon filtration, there was obtained the desired phenylamino-terminated polyetherketone oligomer; it had an intrinsic viscosity of 0.13 and a number average molecular weight of about 1800.

For the preparation of block copolyurethane-carbonates, at least one amine-terminated oligomer and the cyclic polycarbonate oligomer composition are heated at a temperature generally in the range of about 150°–325° C. The reaction may be conducted in the melt or in solution, typical solvents being relatively high boiling liquids such as chlorobenzene and o-dichlorobenzene.

The proportions of amine-terminated oligomer and cyclic polycarbonate oligomer composition are subject to wide variation, depending on the chain lengths of the blocks desired in the product. In general, the weight ratio of reactants may be from about 0.1:1 to about 10:1, preferably from about 0.5:1 to about 2:1.

Anionic polysiloxanes: These materials, convertible by the method of this invention to siloxane-carbonate block copolymers, comprise a plurality of units of the formula

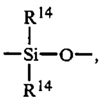

(XXIX)

wherein each $R^{14}$ is independently a hydrocarbon or substituted hydrocarbon radical. The hydrocarbon radicals may be aliphatic, alicyclic or aromatic or combinations thereof; examples are lower alkyl radicals (i.e., alkyl radicals containing up to 7 carbon atoms), phenyl radicals and cyclohexyl radicals. All $R^{14}$ radicals are most often identical and are usually methyl or phenyl and preferably methyl, but the invention also contemplates materials such as block polysiloxanes in which the $R^{14}$ values differ from block to block.

One or more of the $R^{14}$ values may also be substituted hydrocarbon radicals, with the proviso that any substituents present do not interfere with the method of this invention. Illustrative substituents are fluoro, alkoxy, keto and ester groups. However, it is generally preferred for each $R^{14}$ to be a hydrocarbon radical.

In this embodiment of the invention, reagent B is at least one "living" polysiloxane anion. Such anions may be produced by conventional methods exemplified by the reaction of a cyclic polysiloxane with a nucleophilic reagent such as an alkali metal siloxanolate, preferably in the presence of a catalytic amount of a promoter such as dimethyl sulfoxide.

According to this embodiment, the cyclic oligomer composition is added to the anionic polysiloxane with effective agitation. The proportions of reagents are not critical but may be adjusted as needed to produce the desired block lengths in the product. In general, about 0.5-5 parts by weight of polysiloxane are used per part of oligomer composition. Typical reaction temperatures are in the range of about 10°-75° C. and especially about 20°-40° C. It is within the scope of the invention to conduct the reaction in a mold to produce a molded article.

Polyamides: Copolyamidecarbonates may be prepared from anionic polyamides, which may in turn be prepared by reacting at least one lactam of the formula

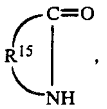

(XXX)

wherein $R^{15}$ is a divalent aliphatic hydrocarbon or substituted hydrocarbon radical containing a chain of about 2-20 carbon atoms, with a basic reagent. Any one or more of a number of known lactams may be used. Preferred are those in which $R^{15}$ is a straight alkylene chain containing about 4-12 carbon atoms. Illustrative lactams are pivalolactam, δ-valerolactam, ε-caprolactam and laurolactam, in which $R^{15}$ is $CH_2C(CH_3)_2$, $(CH_2)_4$, $(CH_2)_5$ and $(CH_2)_{11}$, respectively. ε-Caprolactam is especially preferred.

The basic reagents include inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. The alkali metal hydrides, especially sodium hydride, are preferred.

The lactam is typically heated with the basic reagent at a temperature within the range of about 25°-200° C., preferably about 90°-150° C., until polymerization has taken place to some degree. The reaction may be performed in a conventional chemical reaction vessel or in suitable molding or extrusion apparatus.

The intermediate thus formed, typically an anionic polyamide, is reacted with at least one cyclic polycarbonate oligomer as described hereinabove. The reaction is ordinarily conveniently conducted at a temperature within the range applicable to the step involving the basic reagent.

The relative proportions of the reactants may be widely varied, depending on the molecular weight and other properties desired in the product. Most often, about 1-100 milliequivalents of alkaline reagent are used per mole of lactam. The mole ratio of cyclic oligomer (based on structural units) to lactam may be from about 0.5:1 to about 5:1.

If desired, the reaction may be conducted in a substantially inert organic diluent. Typical diluents include toluene, xylene, chlorobenzene, o-dichlorobenzene and methylene chloride. The reaction may also be conducted in bulk.

The copolyamidecarbonates prepared according to this invention comprise structural units of formula I and of the formula

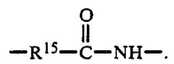

(XXXI)

They may be present in any and all possible combinations. Thus, the copolyamidecarbonates may contain varying proportions and lengths of polyamide chains, comprising a plurality of interconnected moieties of formula XXXI, and polycarbonate chains, comprising similarly interconnected moieties of formula I. They may also contain carbamate and ester moieties of the formulas

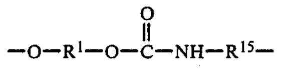

and

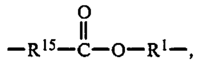

as a result of amide-carbonate exchange.

Polyesters: Anionic polyesters convertible to copolyester carbonates by the method of this invention may be prepared by contacting a lactone of the formula

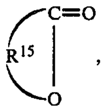

(XXXII)

wherein $R^{15}$ is as previously defined, with a Lewis base. The preferred $R^{15}$ values are straight alkylene chains containing about 4-12 carbon atoms. Illustrative lactones are pivaloloactone, Δ-valerolactone and ε-caprolactone, in which $R^{15}$ is $CH_2C(CH_3)_2$, $(CH_2)_4$ and $(CH_2)_5$, respectively. Pivalolactone and ε-caprolactone are especially preferred.

Lewis bases which catalyze the conversion of lactones to polyesters are known. They include aluminum alkoxides, particularly those containing $C_{2-8}$ alkyl groups; an example is aluminum isopropoxide. It is generally preferred to purify such aluminum alkoxides, as by distillation, just before use in order to promote the formation of polymers of high molecular weight.

According to this aspect of the invention, the catalyst is contacted first with the lactone at a temperature adequate for polymerization thereof, typically about 125°-175° C. The result is the formation of a "living" anionic polylactone species. This species may in turn be reacted with the cyclic polycarbonate oligomer composition at a temperature within the range of about 180°-300° C., whereupon polymerization of said oligomer composition is initiated. Thus, it will be apparent that the invention contemplates initiation of cyclic polycarbonate oligomer mixtures by the "living" anionic polylactone species.

Infrared spectra of the copolyestercarbonates prepared by the method of this invention indicate that they are not predominantly block copolymers, as might be expected. Instead, a substantial amount of equilibration occurs with the formation, for example, of alkyl carbonate moieties derived from the lactone as well as carbonate moieties derived from the cyclic polycarbonate oligomers.

The method of this invention is illustrated by the following examples. All parts are by weight unless otherwise indicated.

EXAMPLE 40

The polyphenylene ether used in Examples 40–41 was formed by the polymerization of 2,6-xylenol by known methods, using a catalyst comprising chemically combined copper, bromide ion, dimethyl-n-butylamine and di-n-butylamine. It had an intrinsic viscosity of 0.24 dl./g., a weight average molecular weight of 28,850 and a number average weight of 8700. It was shown by analysis to contain about one hydroxy group per polymer chain, with about 50% of the polymer chains having aminoalkyl end groups of formula XV wherein $Q^1$ is methyl, each $Q^2$ is hydrogen, each $R^7$ is hydrogen and each $R^8$ is n-butyl.

A solution of 5 parts (41 mmol.) of polyphenylene ether in 16 parts of 2,4-dichlorotoluene was dried by distillation and titrated with a 0.001M solution in tetrahydrofuran of sodium benzophenone ketyl until a blue color persisted. There was then added 10 parts (39 mmol. based on structural units) of a cyclic bisphenol A polycarbonate oligomer mixture similar to that of Example 1, and an additional 5 parts of 2,4-dichlorotoluene. The mixture was heated to reflux and a substantial increase in viscosity was noted after 5 minutes. Refluxing was continued for 1 hour, after which the mixture was cooled and the polymer precipitated by pouring into methanol. The crude polymer had a weight average molecular weight of 158,400 and a number average molecular weight of 37,850.

Unreacted polyphenylene ether was removed from the product by stirring with toluene for several days. The toluene-insoluble fraction comprised the desired block polyphenylene ether-polycarbonate; it had a weight average molecular weight of 187,500 and a number average molecular weight of 49,060. It was found to have two glass transition temperatures at 150° and 210° C., and was easily formed into films by pressing.

EXAMPLE 41

A sample of the polyphenylene ether sodium salt of Example 40 was precipitated from 2,4-dichlorotoluene by pouring into hexane. A 7.5-part (63 mmol.) sample thereof was combined with 15.85 parts (62 mmol.) of the cyclic polycarbonate oligomer mixture of Example 40 and 0.54 part (2.5 mmol.) of diphenyl carbonate was added. The mixture was thoroughly blended at 250° C. in a helicone reactor under nitrogen for 10 minutes, and was then dissolved in methylene chloride and reprecipitated by pouring into acetone. The block polyphenylene ether-polycarbonate had a weight average molecular weight of 32,290 and a number average molecular weight of 15,350.

EXAMPLE 42

Sodium hydride, 250 mg., was added to a solution in dry dimethylformamide of 2 grams of a polyetherimide bisphenol similar to that of Example 35 and having a weight average molecular weight of about 19,800. The mixture was stirred for 2 hours at room temperature and filtered in a dry box under nitrogen. There was then added 2 grams of a cyclic bisphenol A polycarbonate oligomer mixture similar to that of Example 21. Stirring was continued for ½ hour, after which the mixture was poured into methanol containing a small amount of sulfuric acid. The copolyetherimidecarbonate was separated by filtration and dried. It was found to have a weight average molecular weight of 43,200 and two glass transition temperatures, at 148° and 210° C.

EXAMPLE 43

A polyetherimide bisphenol sodium salt was prepared as in Example 42, precipitated by pouring the dimethylformamide solution into dry ethyl ether, filtered and dried. A mixture of 500 mg. of the sodium salt and 500 mg. of a cyclic bisphenol A polycarbonate oligomer mixture similar to that of Example 42 was heated at 250° C. for ½ hour, yielding an opaque methylene chloride-insoluble solid having a melting point of 240° C.

EXAMPLE 44

A solution of 3 drops of 2-t-butylimino-2-diethylamino-1,3-dimethylperhydro-1,3,2-diazaphosphorine in 20 ml. of 2,4-dichlorotoluene was dried by distillation of 5 ml. thereof. There was then added 1 gram of the polyetherimide bisphenol of Example 42 and the mixture was heated to reflux. The polyetherimide bisphenol dissolved and the salt precipitated as a gelatinous solid. Refluxing was continued for 2 hours, after which one gram of a cyclic bisphenol A polycarbonate oligomer mixture similar to that of Example 42 was added and refluxing was continued for ½ hour, during which time the solids dissolved. The solution was precipitated by pouring into methanol which had been acidified by the addition of a few drops of sulfuric acid. The solid which was removed by filtration and dried was the desired block copolyetherimidecarbonate. It had a weight average molecular weight of about 57,700.

The copolyimidecarbonates of this invention have potential for use as engineering thermoplastic resins in various applications. In particular, they may be tailored to provide a combination of the hereinabove-described beneficial properties of polycarbonates and polyimides, especially polyetherimides.

EXAMPLE 45

A mixture of equal weights of a bisphenol A cyclic polycarbonate oligomer mixture similar to that of Example 21 and the phenylamino-terminated polyetherimide oligomer of Example 36 was heated on a glass plate under nitrogen at 280°–300° C. for 1 hour. Upon cooling, the desired block copolyurethanecarbonate was obtained as a tough yellow film which adhered strongly to the glass surface.

EXAMPLE 46

To a solution of 1 part of the phenylamine-terminated polyetherimide oligomer of Example 36 in 5 parts of hot o-dichlorobenzene was added 1 part of the bisphenol a cyclic polycarbonate oligomer of Example 45. The mixture was heated to 90° C., whereupon it became homogeneous. It was cast on a glass plate maintained at 150° C. and heating was continued until the solvent had evaporated. The resulting film was cured at 280°–300° C. for 1 hour and cooled, whereupon the desired copolyurethanecarbonate was obtained as a translucent tough yellow film.

EXAMPLE 47

A solution of 0.73 gram each of the methylamino-terminated polyethersulfone oligomer of Example 38 and the cyclic bisphenol A polycarbonate oligomer mixture of Example 45 in 4 ml. of methylene chloride was poured onto a glass plate and the methylene chloride was allowed to evaporate at 40°–75° C. The plate was heated to 300° C., maintained at that temperature for 1½ hours and cooled. The resulting block copolyurethanecarbonate was obtained as an amber film having a Tg of 159° C.

EXAMPLE 48

A mixture of 3 parts of octamethylcyclotetrasiloxane, 1.51 parts of potassium trimethylsiloxanolate and 0.011 part of dimethyl sulfoxide was stirred in a nitrogen atmosphere for 18 hours. There were then added 3 parts of a cyclic bisphenol A polycarbonate oligomer mixture similar to that of Example 1 and 17.8 parts of dry tetrahydrofuran and stirring was continued for 4 hours. The polymeric product was precipitated by pouring the reaction mixture into methanol and was dissolved in methylene chloride and reprecipitated into acetone. It had weight and number average molecular weights of 65,738 and 36,783, respectively, and contained no cyclic carbonate oligomer species. It was shown by hydrogen nuclear magnetic resonance to comprise 72% siloxane and 28% carbonate units.

EXAMPLE 49

ε-Caprolactam, 250 mg. (2.21 mmol.), was melted by heating to 140° C. under nitrogen. Sodium hydride, 9 mg. (0.375 mmol.), was added and heating was continued for 1½ hours. There was then added 100 mg. of a cyclic bisphenol A polycarbonate oligomer mixture similar to the product of Example 21. Heating was continued for ½ hour, during which thickening of the reaction mixture was observed. An additional 900 mg. of cyclic polycarbonate oligomer mixture (total 3.94 mmol. based on structural units) was added and the reaction mixture was heated for 6 hours at 250° C.; an additional increase in viscosity was noted. The product was insoluble in organic solvents and was shown by infrared and DSC analysis to be an extensively interchanged product containing carbamate linkages.

EXAMPLE 50

A mixture of 1 gram (3.9 mmol.) of a bisphenol a cyclic polycarbonate oligomer mixture similar to that of Example 21, 2 grams (20 mmol.) of pivalolactone and 0.8 mg. (0.0038 mmol.) of freshly distilled aluminum isopropoxide was heated overnight at 140° C., whereupon polymerization of the pivalolactone was initiated. The mixture was then warmed slowly to 200° C. and maintained at that temperature for 1 hour, followed by 2 hours at 250° C. The polymeric product was insoluble in most organic solvents and had a glass transition temperature of 120° C. and a crystalline melting point of 231.5° C.

EXAMPLE 51

The procedure of Example 50 was repeated, using 1 gram (10 mmol.) of pivalolactone, 2.54 grams (10 mmol.) of cyclic polycarbonate oligomer mixture and 2 mg (0.01 mmol.) of aluminum isopropoxide. The product was dissolved in chloroform (in which it was soluble) and reprecipitated by pouring into methanol; it was again dissolved in chloroform, reprecipitated by pouring into acetone, filtered and dried. The product had a weight average molecular weight of 123,400, a glass transition temperature of 117.9° C. and a crystalline melting point of 221.9° C.

Certain of the copolycarbonates prepared by the method of this invention are known in the art, as are their utilities. Examples are the block polyphenylene ether-polycarbonates, the block copolysiloxanecarbonates and the copolyestercarbonates.

All of the copolycarbonates are useful in situations where a combination of the properties of the homopolymers is desired. For example, the copolyurethanecarbonates are of particular value in polycarbonate applications where high thermal stability and solvent resistance are required. The copolyamidecarbonates may be used as plastics, adhesives and lacquers.

What is claimed is:

1. A method for preparing a copolycarbonate which comprises reacting (A) at least one aromatic cyclic polycarbonate oligomer composition with (B) at least one acyclic polymer other than a polycarbonate, said polymer containing nucelophilic moieties which are effective to ring-open the cyclic molecules of reagent A.

2. A method according to claim 1 wherein reagent A comprises a plurality of structural units of the formula $$-O-R^1-O-\overset{O}{\overset{\|}{C}}-, \qquad (I)$$

wherein at least about 60% of the total number of $R^1$ values are divalent aromatic orgnic radicals, the balance thereof being aliphatic, alicyclic or aromatic organic radicals.

3. A method according to claim 2 wherein a mixture of cyclic polycarbonate oligomers is used.

4. A method according to claim 3 wherein each $R^1$ radical has the formula $$-A^1-Y^1-A^2- \qquad (II)$$

wherein each of $A^1$ and $A^2$ is a single-ring divalent aromatic radical and $Y^1$ is a bridging radical in which one or two atoms separate $A^1$ from $A^2$.

5. A method according to claim 4 wherein each of $A^1$ and $A^2$ is p-phenylene and $Y^1$ is isopropylidene.

6. A method according to claim 2 wherein reagent B is a living anionic vinyl polymer.

7. A method according to claim 2 wherein reagent B contains deprotonated hydroxy or carboxy groups.

8. A method according to claim 7 wherein reagent B is at least one salt of a polyphenylene ether.

9. A method according to claim 8 wherein the polyphenylene ether salt is an alkali metal or alkaline earth metal salt of a homopoly(2,6-dimethyl-1,4-phenylene) ether.

10. A method according to claim 9 wherein the polyphenylene ether salt is a sodium salt and the reaction is conducted at a temperature in the range of about 190°-260° C.

11. A method according to claim 10 wherein the reaction is conducted in solution.

12. A method according to claim 10 wherein the reaction is conducted in the melt.

13. A method according to claim 7 wherein reagent B is a salt of a polyimide bisphenol of the formula

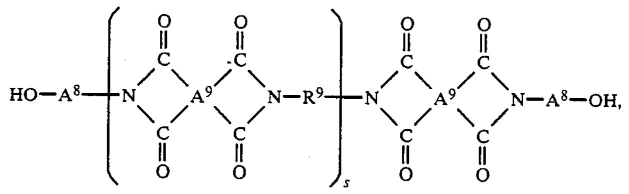

(XIX)

wherein $A^8$ is a divalent aromatic radical; $A^9$ is a tetravalent aromatic radical; $R^9$ is an aromatic hydrocarbon radical containing about 6–20 carbon atoms, an alkylene or cycloalkylene radical containing about 2–20 carbon atoms, or a bis-alkylenepoly(dialkylsiloxane) radical; and s is from 1 to about 100.

14. A method according to claim 13 wherein $A^8$ is an aromatic hydrocarbon radical; $R^9$ has the formula

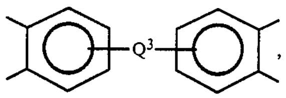

(XX)

wherein $Q^3$ is a single bond or a divalent bridging group; and the salt is a sodium or tetrakis(amino)phosphonium salt.

15. A method according to claim 14 wherein $R^9$ is an aromatic hydrocarbon radical and $Q^3$ is $—O—R^{10}—O—$, wherein $R^{10}$ has one of the formulas

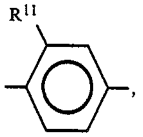

(XXI)

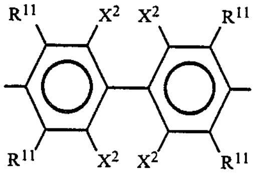

and (XXII)

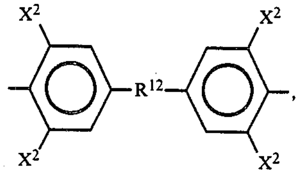

(XXIII)

wherein each $R^{11}$ is independently hydrogen or methyl; $R^{12}$ is a straight chain or branched alkylene radical containing 1–5 carbon atoms, —O—, —S—, $—SO_2—$,

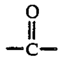

or $—C(CF_3)_2—$; and each $X^2$ is independently hydrogen or halogen.

16. A method according to claim 15 wherein $A^8$ is p-phenylene or m-phenylene, $Q^3$ has formula XXIII, $R^{12}$ is isopropylidene and each $X^2$ is hydrogen.

17. A method according to claim 16 wherein $R^9$ is m-phenylene or bis(4-phenylene)methane.

18. A method according to claim 7 wherein reagent B contains at least one neutral nucleophilic moiety.

19. A method according to claim 18 wherein reagent B is at least one secondary amine-terminated aromatic oligomer having the formula $$R^{13}—NH—A^{10}(Z^4A^{11}Z^4A^{12})_tZ^4A^{11}Z^4—A^{10}—NHR^{13} \qquad \text{(XXV)}$$

wherein:

$R^{13}$ is $C_{1-4}$ alkyl or phenyl;

each of $A^{10}$, $A^{11}$ and $A^{12}$ is independently an aromatic radical, with $A^{10}$ and $A^{12}$ being divalent and $A^{11}$ being divalent or tetravalent;

$Z^4$ is a bridging radical containing at least one non-carbon linking atom; and t is from 0 to about 20.

20. A method according to claim 19 wherein $A^{10}$ is p-phenylene or m-phenylene; $Z^4$ is oxygen or has the formula

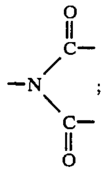

(XXVIII)

and $A^{11}$ has one of the formulas

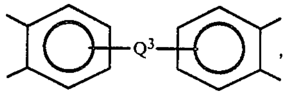

(XX)

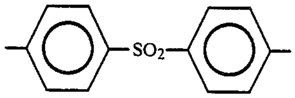

and (XXVI)

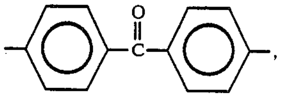

(XXVII)

wherein $Q^3$ is a single bond or a divalent bridging group.

21. A method according to claim 20 wherein $R^{13}$ is methyl or phenyl, $Z^4$ has formula XXVIII, $A^{11}$ has formula XX, $Q^3$ is $—O—R^{10}—O—$ and $R^{10}$ has one of the formulas

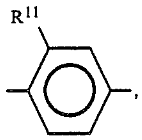, (XXI)

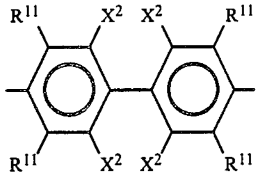 and (XXII)

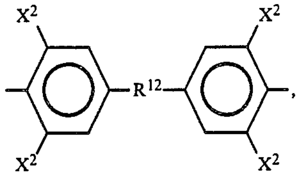, (XXIII)

wherein each $R^{11}$ is independently hydrogen or methyl; $R^{12}$ is a single bond, a straight chain or branched alkylene radical containing 1-5 carbon atoms; —O—, —S—, —$SO_2$—,

or —$C(CF_3)_2$—; and each $X^2$ is independently hydrogen or halogen.

22. A method according to claim 21 wherein $A^{12}$ is m-phenylene, $R^{10}$ has formula XXIII, $R^{12}$ is isopropylidene and each $X^2$ is hydrogen.

23. A method according to claim 21 wherein $Z^4$ is oxygen and $A^{12}$ is the bis(4-phenylene)propane radical.

24. A method according to claim 23 wherein $A^{11}$ has formula XXVI.

25. A method according to claim 23 wherein $A^{11}$ has formula XXVII.

26. A method according to claim 7 wherein reagent B is an anionic polymer of a ring-opened compound.

27. A method according to claim 26 wherein reagent B is an anionic polysiloxane comprising a plurality of units of the formula

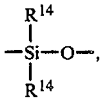, (XXIX)

wherein each $R^{14}$ is independently a hydrocarbon or substituted hydrocarbon or substituted hydrocarbon radical.

28. A method according to claim 27 wherein each $R^{14}$ is methyl and the reaction is conducted at a temperature in the range of about 10°-75° C.

29. A method according to claim 28 wherein reagent B is an anionic intermediate formed by reacting at least one lactam of the formula

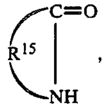, (XXX)

wherein $R^{15}$ is a divalent aliphatic hydrocarbon or substituted hydrocarbon radical containing a chain of about 2-20 carbon atoms, with a basic reagent.

30. A method according to claim 29 wherein $R^{15}$ is an alkylene radical and the basic reagent is an alkali metal hydride.

31. A method according to claim 30 wherein $R^{15}$ contains a chain of about 4-12 carbon atoms, and the reaction of the lactam with the basic reagent and the reaction of said basic reagent with reagent A are both conducted at a temperature within the range of about 90°-150° C.

32. A method according to claim 31 wherein said reactions are conducted in the melt.

33. A composition according to claim 32 wherein $R^1$ is $(CH_2)_5$.

34. A method according to claim 26 wherein reagent B is formed by contacting a lactone having the formula

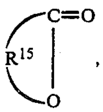, (XXXII)

wherein $R^{15}$ is a divalent aliphatic hydrocarbon or substituted hydrocarbon radical containing a chain of about 2-20 carbon atoms, with a non-halide-containing Lewis acid at a temperature in the range of about 125°-175° C.

35. A method according to claim 34 wherein $R^{15}$ is an alkylene radical containing a chain of about 4-12 carbon atoms.

36. A method according to claim 35 wherein the Lewis acid is a freshly purified aluminum $C_{2-8}$ alkoxide.

37. A method according to claim 36 wherein the lactone is ε-caprolactone.

38. A method according to claim 36 wherein the lactone is pivalolactone.

* * * * *

UNITED STATES PATENT AND TRADEMARK OFFICE
CERTIFICATE OF CORRECTION

PATENT NO. : 4,760,117

DATED : July 26, 1988

INVENTOR(S) : Thomas Lane Evans, Tohru Takekoshi
Patricia P. Anderson

It is certified that error appears in the above-identified patent and that said Letters Patent is hereby corrected as shown below:

Col. 13
Line 22
"sprayed" should read "sparged"

Col. 17
Line 28
"sulfonyl" should read "sulfone"

Col. 36
Line 31
"orgnic" should read "organic"

Col. 40
Line 7
"28" should read "26"

Signed and Sealed this

Twenty-fourth Day of July, 1990

*Attest:*

HARRY F. MANBECK, JR.

*Attesting Officer* *Commissioner of Patents and Trademarks*